May 5, 1959  E. L. BENNO  2,884,811
DIFFERENTIAL BRAKE
Filed June 17, 1957
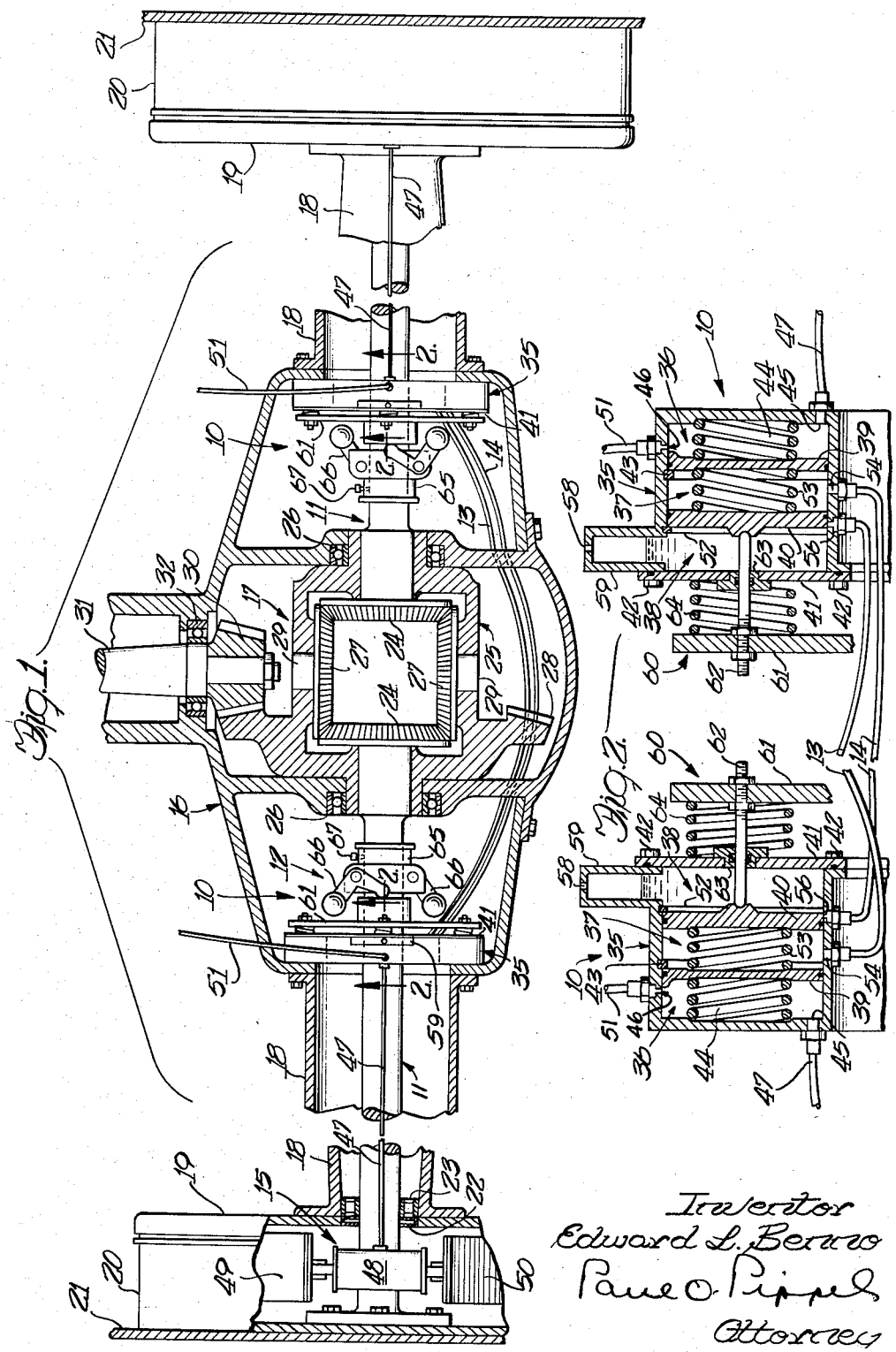
Inventor
Edward L. Benno
Paul O. Pippel
Attorney

United States Patent Office 2,884,811
Patented May 5, 1959

2,884,811
DIFFERENTIAL BRAKE

Edward L. Benno, Skokie, Ill., assignor to International Harvester Company, Chicago, Ill., a corporation of New Jersey Application June 17, 1957, Serial No. 666,032

12 Claims. (Cl. 74—711)

This invention relates generally to differential gear devices such as used in motor vehicles for dividing the delivered engine torque between the two driving wheels, and more specifically to certain means automatically operating to vary the differential action of such devices.

Motor vehicles are provided with differential gearing between the delivered engine power and the driving wheels so that equal driving forces are delivered to both wheels when the vehicle is moving in a straight line or turning on a curve. In turning on a curve the wheel on the outside of the curve must rotate faster than the wheel on the inside or one of the wheels would slide on the ground. The differential gearing prevents any sliding of the wheels on a curve by maintaining the driving torque to both wheels while permitting relative rotation between the wheels.

This differential gearing has the important disadvantage in that when a situation arises wherein there is a large difference in the tractive effort between the driving wheels, the wheel with the little tractive effort will spin while the other wheel will remain stationary. This well-known condition often occurs when one of the driving wheels of the motor vehicle is on dry pavement while the other wheel is on ice or snow. To provide for rotation of the stationary wheel, some means must be provided for delivering some of the developed engine power to that wheel.

The object of the present invention is to provide a device for producing a torque reaction on the differential gearing of a motor vehicle under a condition wherein one wheel has insufficient tractive effort to supply sufficient torque reaction to the differential for the other wheel.

It is a further object of the present invention to provide speed responsive means for each wheel of a motor vehicle driven through differential gearing for braking one output member of the differential gearing to provide for the application of power to the other output member.

It is a further object of the present invention to provide means for braking either of the two output members of the differential gearing of a motor vehicle for driving the wheels thereof with that means operating independent of any control by the operator of the motor vehicle.

It is a further object of the present invention to provide a differential braking arrangement such as described above wherein the braking means includes a portion of the hydraulic brake system for the wheels of the motor vehicle.

Other objects and features of the present invention will be apparent upon a perusal of the following specification and drawing of which:

Figure 1 is a top plan view of a portion of the rear axle assembly of a motor vehicle constructed according to the present invention and shown partially in cross section, and Figure 2 is an enlarged vertical cross sectional view of a portion of the structure shown in Figure 1 and taken along the lines 2—2 of Figure 1.

The present embodiment is the preferred embodiment but it is to be understood that changes can be made in the present embodiment by one skilled in the art without departing from the spirit and scope of the present invention.

Generally, the present invention comprises a pair of hydraulic valve and motor assemblies 10, each being mounted in cooperation with one of the axle shafts 11 and each being operated by a governor assembly 12. The governor assemblies 12 are each mounted on one of the axle shafts 11. The hydraulic valve and motor assemblies 10 are inter-connected by suitable hydraulic fluid conduits 13 and 14 and are also connected into the braking system for each driving wheel. Generally, the operation of the present invention may be briefly described as follows: When either of the driving wheels is stationary, the hydraulic valve and motor assembly 10 of the stationary wheel conditions the hydraulic valve and motor assembly 10 of the other or spinning wheel so that if that spinning wheel is rotated at an excessive speed relative to the stationary wheel, the hydraulic valve and motor assembly 10 of the rotating or spinning wheel will be operated by its associated governor assembly 12 to cause the operation of the hydraulic brake for that wheel to brake that wheel. As the rotating wheel is braked, a torque reaction will be developed and applied through its axle shaft onto the differential gearing, and this torque reaction on the differential gearing will cause the engine power delivered thereto to be applied to the stationary wheel to cause its rotation. As the previously stationary wheel accelerates and as the previously spinning wheel slows down, the governor assembly 12 operating on the hydraulic valve and motor assembly 10 of the previously stationary wheel will condition the hydraulic valve and motor assembly 10 of the previous spinning wheel to prevent any further application of the hydraulic brake for that wheel. In the present invention, advantage is taken of the known fact that relative to many governor speeds, the speed of the axle shaft is relatively low so that the governor valve assemblies 12 will not operate on the hydraulic valve and motor assemblies 10 until a relatively high axle and wheel speed is produced, such as is common when attempting to drive a motor vehicle with one of the driving wheels on dry pavement and with the other driving wheel on a surface such as ice. This feature will be further explained in the detailed description of the present invention which follows herefrom.

The rear axle assembly of the motor vehicle (not shown) comprises the differential housing 16 having the differential gearing 17, the governor assemblies 12 and the hydraulic valve and motor assemblies 10 mounted therein. The rear axle assembly further comprises the axle housings 18 mounted on each side of the differential housing 16. A backing plate 19 for each wheel is mounted on the outer end of each axle housing 18. The brake drum 20 for each wheel is secured to the outer end of each axle shaft 11. The wheels 21, of which only a small cross section are shown, are mounted to the brake drums 20 and axle shaft 18. Each axle shaft 11 extends from the wheel 21 thru a suitable oil seal 22 and a bearing 23 at the outer end of the axle housing 18, through the axle housing 18 and into the differential housing 16. The inner end of each axle shaft 11 is keyed to a beveled gear 24. The inner end of each axle shaft 11 is also journalled through a suitable opening in the differential carrier or spider 25, and the differential spider 25 is rotatively mounted through bearings 26 supported by the differential housing 16. The differential spider or carrier 25 carries a pair of bevel pinion gears 27 and a ring gear 28. The bevel pinion gears 27 are rotatively carried by the differential spider 25 through shafts 29 and are mounted to mesh with the two bevel gears 24 of the axle shafts 11. The ring gear 28 which is formed about the differential spider 25 meshes with a drive pinion gear 30. The drive pinion gear 30 is secured to the drive shaft 31. The drive shaft 31 is rotatively mounted through the differential housing 16 by means of a bearing 32, and the drive shaft 31 is suitably connected to the engine (not shown) of the motor vehicle. When sufficient tractive effort exists at both driving wheels, the rotating drive shaft 31 will rotate the driving pinion gear 30 to in turn rotate the differential spider 25 through the ring gear 28. The rotating differential spider 25 will rotate the bevel gears 24 through the bevel pinion gears 27. The rotating bevel gears 24 will rotate the axle shafts 11 to in turn rotate the wheels 21. If either of the axle shafts 11 encounters greater resistance to rotation than the other, it may slow up or stop while the other axle shaft 11 correspondingly increases its speed, since the bevel gears 24 are free to rotate relative to each other through a rotation of the bevel pinion gears 27 on the shafts 29. The resistance either wheel encounters to rotation is applied as a torque reaction to the differential gearing, and the torque applied to the other wheel is directly proportional to that torque reaction. If one wheel is positioned on a surface such as ice, substantially no resistance is encountered to rotation by that wheel, and, disregarding small frictional forces in the wheel assembly itself, no torque reaction will be applied by that wheel and its axle shaft to the differential spider 25. Therefore, with substantially no torque reaction, no torque will be applied to rotate the other wheel, and all of the torque applied to the differential spider 25 by the drive shaft 31 will be used to rotate the wheel which encounters substantially no resistance to rotation.

The hydraulic valve and motor assemblies 10 of the present invention are substantially identical and comprise an annular cylinder 35 mounted within the differential housing 16 concentrically of the axle shaft 11. Each annular cylinder 35 is divided into three compartments 36, 37 and 38 by two annular plates or pistons 39 and 40 which, with the annular cylinders 35 form a hydraulic valve and motor arrangement. The compartment 36 is defined by the annular cylinder 35 and piston 39. Compartment 37 is defined by the annular cylinder 35 and annular pistons 39 and 40, and compartment 38 is defined by the annular cylinder 35 and the annular piston 40 and an annular plate 41. The annular plate 41 includes sealing means carried at the inner and outer peripheries thereof and is secured over the open end of the annular cylinder 35 by means of fasteners such as bolts 42.

The maximum size of the compartment 36 is determined by a snap ring 43 which is mounted in a suitable groove in the annular cylinder 35, as may be seen in Figure 2. The piston 39 abuts the snap ring 43 when the compartment 36 defines its maximum volume. The inner and outer peripheries of the piston 39 are provided with suitable fluid sealing rings so that the piston 39 may be moved axially of the annular cylinder 35 with no fluid leakage between the compartments 36 and 37. The piston 39 is biased against the snap ring 43 by a plurality of coiled springs 44, only one of which is shown in each of the assemblies 10 of Figure 2. The coiled springs 44 are evenly spaced from each other within the compartment 36. The compartment 36 further includes two hydraulic fluid ports 45 and 46. Port 45 is mounted through the wall of the annular cylinder 35 opposite from the piston 39, and hydraulic fluid conduit 47 is connected thereto. The hydraulic fluid conduit 47 of each assembly 10 is connected to one of the brake cylinders 48 for one of the driving wheels. The brake cylinders 48 form part of a conventional braking system for the wheels of the vehicle and are operatively connected to brake shoes 49. Although the wheel assemblies shown in the drawing include only one brake system, it is to be understood that the subject invention may also be used on a motor vehicle having two independent braking systems. For example, many truck constructions provide a compressed air braking system and a hydraulic fluid braking system, and in such an arrangement the conduits 47 in the present invention would be connected into the brake cylinders for the hydraulic fluid braking system. Port 46 of compartment 36 is somewhat irregularly shaped. The innermost portion of the port 46 is formed to have a substantially rectangular or oblong shape with the major axis thereof disposed parallel to the plane of the piston 39. The outer portion of the port 46 is conventionally cylindrically formed for easy attachment of conduit 51 thereto. Port 46 has the same cross sectional area throughout its entire depth, and the inner portion of port 46 is positioned substantially adjacent the marginal edge of piston 39 when piston 39 is positioned against snap ring 43. Conduits 51 of each of the assemblies 10 are extended to the master cylinder (not shown) of the braking system for the motor vehicle. Thus it may be seen that when the piston 39 is positioned against snap ring 43, and when the master cylinder is operated by the associated brake pedal of the motor vehicle, hydraulic fluid is directed through conduits 51, ports 46, compartments 36, ports 45, conduits 46 to the brake cylinders 48 of each wheel assembly thereby operating the brake cylinders 48 to apply the brake shoes 49 and 50 to the brake drums 20 to brake the wheels of the motor vehicle.

Each of the assemblies 10 is provided with another snap ring 52. The snap ring 52 is mounted in a suitable groove in the annular cylinder 35 and serves as a stop for the piston 40. The piston 40 which defines one side of the compartment 37 is provided with suitable sealing rings in the inner and outer peripheries thereof whereby the piston 40 is slidable axially of the annular cylinder 35 without permitting any leakage of hydraulic fluid between compartments 37 and 38. Piston 40 is biased against snap ring 52 by means of a plurality of coiled springs 53. The plurality of coiled springs 53 for each compartment 37 are disposed in a spaced apart relationship to each other within the compartment 37 and project against the piston 39 and the piston 40 the snap ring 52. Each of the compartments 37 is provided with a port 54 formed through the annular cylinder 35 and positioned substantially adjacent to piston 39 so that port 54 is positioned substantially at the end of the stroke of piston 40 away from the snap rings 52. Port 54 of the left assembly 10 is connected through hydraulic fluid conduit 13 to a port 56 formed through the annular cylinder 35 of the right assembly 10, and port 54 of the right assembly 10 is connected through hydraulic fluid conduit 14 to an identical port 56 in the left assembly 10. The port 56 of each of the assemblies 10 is formed similar to ports 46 in that although the ports 56 have the same cross-sectional area throughout their entire depth, the inner portion thereof is rectangularly shaped with the major axes thereof lying in a plane parallel to the plane of piston 40, and with the outer portion thereof substantially cylindrical for easy connection to the conduits 13 and 14. The ports 56 are positioned in the annular cylinders 35 so that when the pistons 40 abut the snap rings 52, the peripheral edge portion of pistons 40 on the side toward the compartments 38 barely covers the inner portion of the ports 56. Thus it may be seen that a slight movement of the piston 40 away from the snap rings 52 will immediately uncover ports 56 to free fluid interchange with compartment 38.

The compartments 38 which function as reservoirs in a manner to be described below are each provided with a vent hole 58. The vent hole 58 is formed through a portion of the annular cylinder 35 formed as an upstanding extension of compartment 38.

To provide for reciprocating movement of the pistons 39 and 40, a piston rod assembly 60 is included in each of the assemblies 10. The piston rod assemblies 60 each comprise a circular member 61 which has a hub portion freely journalled about the axle shaft 11 and a radially extending flange portion. A plurality of piston rods 62 are adjustably secured to the flange portion of the circular member 61, and extend perpendicularly therefrom. The plurality of piston rods 62 for each assembly 60 are positioned in a circular spaced-apart relationship to each other and extend through a shaft sealing member 63 mounted through a suitable opening in the plate 41. The inner end of each piston rod 62 cooperates with a boss formed on the piston 40. Thus it may be seen that when the assemblies 60 are moved axially of the axle shaft 11, the piston rods 62 will move the pistons 40 away from the snap rings 52 and inwardly of the annular cylinders 35. A plurality of coiled springs 64 are also provided for biasing the piston rods 62 outwardly of the annular cylinders 35. One coiled spring 64 is provided for each piston rod 62 and is positioned between the plate 41 and the flange portion of the member 61.

The governor assemblies 12 of the present embodiment, which may be of any suitable type known in the art, each comprise a carrier 65 and a plurality of governor weight members 66. The carrier member 65 is journalled on the axle shaft 11 and is adjustably secured thereto by a set screw 67. The governor weight members 66 are formed as bell cranks with weights mounted at one end of one of the legs of each bellcrank. The junction of the two legs of the bellcrank is pivotally mounted on the carrier 65, and the end of the other leg of the bellcrank cooperates with the hub portion of the member 61. Thus it may be seen that when the axle shafts 11 are rotated at a certain speed, the centrifugal force produced by the governor weights will pivot the members 66 to cause the members 66 to apply a force to the members 61 to move the members 61 toward the annular cylinder 35, thereby moving the piston rods 62 inwardly of the annular cylinder 35, thereby moving the pistons 40 inwardly of the cylinders 35.

Turning next to the description of the operation of the instant invention, reference is again made to the drawing. It should be understood that the chambers 36, 37 and 38 of both assemblies 10, and all of the conduits 48, 13, 14 and 47 contain hydraulic fluid. The compartments 38 are not completely filled with hydraulic fluid as these compartments function as reservoirs with the hydraulic fluid level therein extending a short distance into portions 59 when the system is in the normal unoperated position. Considering first the operation when the left wheel is on some surface such as dry pavement and the right wheel is on a surface having a very low coefficient of friction, such as ice, the engine power delivered through the drive shaft 31 to the differential gearing 17 will cause the right wheel to be rotated. The left wheel will remain substantially stationary since no torque reaction is applied by the axle 11 of the right wheel on the differential gearing. With the left wheel and its axle 11 substantially stationary, the left assembly 10 will have an operated position, such as shown in Figures 1 and 2. The port 56 will be blocked by the piston 40 of the left assembly 10, and the piston 39 thereof will be positioned against the snap ring 43. Since the axle shaft 11 of the right wheel is rotating, the governor assembly 12 thereof will be rotated. At this point note should be made of the fact that advantage is herein taken of the inherent operation of governor assemblies such as 12 wherein no substantial force will be applied by the members 66 on the member 61 until a relatively high axle speed is attained. However, the governor weights are so selected and the governor assembly is so constructed and adjusted that excessively high speeds are not necessary, it merely being necessary that the governor assembly 12 has substantial operation when reaching a speed which is greater than any increment of speed ever achieved between the driving wheels in the normal operation of the vehicle in moving around various corners and curves at various practical speeds. Upon attaining the certain speed at which it is desired that the governors 12 operate, the governor assembly 12 associated with the right axle shaft 11 will operate on the member 61 of the right assembly 10 to move the piston rods 62 thereof, against the bias of the springs 64, to move the piston 40. Since the piston 40 of the left assembly 10 is blocking port 56, the hydraulic fluid in conduit 14 and compartment 37 of the right assembly 10 will be trapped, and the force moving piston 40 of the right assembly will be transmitted through the trapped hydraulic fluid in compartment 37, to move piston 39 inwardly of the annular cylinder 35. The piston 39 in moving inwardly of the annular cylinder 39 will immediately block port 46 and further movement of the piston 39 will direct hydraulic fluid through port 45 and conduit 47 of the right wheel assembly to the brake cylinder 48 thereof. The brake assembly of the right wheel will then be gradually applied and the right wheel will begin to slow down. As soon as the hydraulic brake in the right wheel is applied, an immediate torque reaction will be applied by the right axle shaft 11 to the differential gearing 17, and a proportional amount of the delivered engine torque will be applied through the differential gearing 17 to the left axle shaft 11 thereby causing the left wheel to rotate to move the motor vehicle. As the right wheel gradually decelerates the governor assembly 12 thereof will gradually reduce the force on the member 61 and the pistons 40 and 39 respectively will gradually move toward the snap rings 52 and 43. The piston 40 will move toward port 56, and piston 39 moves toward a position to uncover port 46. As shown in the drawings, each of the pistons 39 is formed to have a shoulder thereon cooperating with the port 46. This shoulder extends outwardly from the plane of the piston 39 a distance sufficient to provide for proper blocking and unblocking of ports 46. While the right wheel is decelerating, the left wheel will be accelerating and in the acceleration thereof, the left governor assembly 12 will gradually be operated to move the piston 40 of the left assembly 10. As the left piston 40 moves inwardly of the annular cylinder 35, the piston 39 will not be moved since hydraulic fluid will be forced through port 54, conduit 13, to and through port 56 of the right assembly 10 and into compartment 38 thereof. When piston 40 of the left assembly 10 begins to move, it will uncover the port 56 thereof. On this occurrence, the bias of the coiled springs 44 in the right assembly will move piston 39 thereof against snap ring 43. The hydraulic fluid which was previously trapped in compartment 37 will be directed through port 54 of the right assembly, through conduit 14, through port 56 of the left assembly and into compartment 38 thereof. Assuming that both wheels of the motor vehicle now have sufficient traction, the two driving wheels will operate at speeds determined only by the differential gearing 17. The operations described above will occur in a reverse pattern when the left wheel rather than the right wheel is on a surface such as ice, with the right wheel on a surface such as dry pavement.

Describing next the operation of the invention when both wheels thereof are on a surface such as dry pavement, and assuming that the motor vehicle will travel in a substantially straight line, the engine power will be delivered through the differential gearing 17 to both wheels through their respective axle shafts 11 and as the axle shaft 11 speeds increase from zero, the governor assemblies 12 will rotate at corresponding speeds. No operation of these governor assemblies 12 against the members 61 will occur until the previously mentioned certain relatively high speed is attained. With the assemblies 10 in their normal unoperated position, as shown in the drawing, the braking sysem of the motor vehicle is fully operable through conduits 51, ports 46, compartments 36, ports 45, and conduits 47 to the brake cylinders 48 of each wheel. When the noted relatively high speeds of the axle shafts 11 is reached, both governor assemblies 12 will operate against the members 61. The initial movement of members 61 will cause pistons 40 to unblock both ports 56. With both ports 56 unblocked, any further movement of both of the pistons 40 inwardly of the annular cylinders 35 will merely cause hydraulic fluid to be forced from compartment 37 of one assembly 10 into the compartment 38 of the other assembly 10, with no resulting movement of the pistons 39. Any slight increment of pressure that may be applied on pistons 39 before the ports 56 are blocked is absorbed in a slight initial movement of the brake shoes 49 and 50 toward engagement with the brake drums 20. The force in the coiled springs 53 is very slight compared to that of the coiled springs 44, serving merely to insure the movement of the pistons 40 to their normally restored positions against snap rings 52.

It has been pointed out that the governor assemblies 12 do not operate until a relatively high axle shaft speed is attained. This condition insures proper operation in that the normal operation of the differential gearing will not cause operation of the present invention since the speed necessary for operation of the governor assemblies 12 is relatively so high that to make a sharp turn of the motor vehicle at that speed would be entirely impractical.

Although the ports 45, 54 and 56 are shown in the upper portions of the annular cylinders 35, it is to be understood that these ports may be formed through other portions about the inner and outer peripheries of the annular cylinders 35. Further, although the compartments 38 are shown and described as reservoirs integral with the annular cylinders 35, it is to be understood that the compartments 38 may be made substantially smaller and connected by suitable conduit tubing to a vented remote reservoir. It is merely necessary that the remote reservoir be positioned vertically above the assemblies 10. It should be noted further that the compartments 38 serve the additional function of maintaining sufficient hydraulic fluid in the other compartments, conduits and braking apparatus connected thereto, since by maintaining a higher level of hydraulic fluid in these compartments 38 than in the other portions of the system, any leakage of hydraulic fluid from the other portions of the system will be replenished by hydraulic fluid seepage from compartment 38. A vented remote reservoir connected to compartments 38 could also be used as a means for checking and maintaining proper amounts of hydraulic fluid in the system. Further, although the assemblies 10 are shown as generally annular in shape, it is to be understood that the annular cylinders 35, and the pistons 39 and 40, may also be formed to have a cylindrical rather than an annular shape.

Having described the invention, what is considered new and desired to be protected by Letters Patent is:

1. In combination with a differential gearing arrangement, a brake for each of the two output members of said differential gearing arrangement, a pair of motors for said two output members, means connecting each of said motors to one of said brakes for operating said brakes responsive to the operation of the motor connected thereto, means connected to each of said output members for operating either one of said motors responsive to a certain speed of the output member associated therewith, and means operating responsive to the operation of either one of said output members to said certain speed for disabling the motor associated with the other of said output members.

2. In combination with a differential gearing arrangement, a hydraulically operated brake for each of the two output members of said differential gearing arrangement, a pair of hydraulic motors for each of said output members, means connecting each of said motors to one of said hydraulic brakes for operating said hydraulic brakes responsive to the operation of the motor connected thereto, means connected to each of said output members for operating either one of said motors responsive to a certain speed of the output member associated therewith, and means operating responsive to the operation of either one of said output members to said certain speed for disabling the motor associated with the other of said output members.

3. In a combination as claimed in claim 2 wherein said certain speed is higher than any incremental speed occurring between said two output members for any practical speeds of said two output members.

4. In combination with a differential gearing arrangement, a hydraulically operated brake for each of the two output members of said differential gearing arrangement, a pair of hydraulic motors for said output members, a pair of hydraulic conduits connecting each of said motors to one of said hydraulic brakes for delivering hydraulic fluid under pressure to each of said hydraulic brakes responsive to the operation of the motor associated therewith to operate said hydraulic brakes, means connected to each of said output members for operating either one of said motors responsive to a certain speed of the respective output members associated therewith, and means operating responsive to the operation of either one of said output members to said certain speed for disabling the motor associated with the other of said output members.

5. In a combination as claimed in claim 4, wherein manually operable brake means is provided including hydraulic conduits connected to each hydraulic motor for delivering hydraulic fluid under pressure through said hydraulic motors to said conduits connected to said brakes for manually operating said brakes.

6. In a combination as claimed in claim 5 wherein said hydraulic motors are formed so that upon the initial operation thereof said conduits connected thereto from said manually operable brake means are blocked against any hydraulic fluid flow therethrough.

7. In combination with a differential gearing arrangement a hydraulically operated brake for each of the two output members of said differential gearing arrangement, a pair of hydraulic motors for said output members, means connecting each of said motors to one of said hydraulic brakes for operating each of said hydraulic brakes responsive to the operation of the motor connected thereto, a pair of governors, each one of said governors mounted in cooperation with one of said two output members of said differential gearing arrangement whereby each of said governors is operated by one of said two output members, said governors being adjusted so that the respective ones of said motors are operated thereby when the output member associated therewith acquires a certain predetermined rotational speed, and means for disabling either one of said motors responsive to said certain speed of the output member associated with the other one of said motors.

8. In a motor vehicle having differential gearing for driving two axles in turn driving a pair of wheels wherein each of the wheels is provided with a hydraulic brake, a pair of hydraulic motors, one of said hydraulic motors connected to operate one of said brakes and the other of said motors connected to operate the other of said brakes, means cooperating with one of said axles for operating said one of said motors responsive to the rotation of said one of said axles at a certain predetermined speed, and means cooperating with the other of said axles for operating said other hydraulic motor responsive to the rotation of said other axle at said certain predetermined speed, and means connected between said motors operating responsive to the rotation of said one axle at said certain predetermined speed for disabling said other motor, and operating responsive to the rotation of said other axle at said certain predetermined speed for disabling said one motor.

9. In a motor vehicle, differential gearing connected to drive a pair of axle shafts, a pair of driving wheels, each of said driving wheels connected to one of said axle shafts, a hydraulic brake system associated with each of said driving wheels for braking each of said wheels, a pair of hydraulic motors, a pair of governors, each of said governors mounted on one of said axle shafts in cooperation with one of said hydraulic motors, means interconnecting each of said hydraulic motors with the cooperating governor so that said hydraulic motors are operated by said governors, each of said hydraulic motors connected to the braking system for one of said wheels so that said wheels are braked responsive to the operation of said hydraulic motors, said governors being formed so that said hydraulic motors remain unoperated until said axle shafts rotate at a certain predetermined speed, and means connected between said hydraulic motors for disabling the operation of one of said motors responsive to a certain operation of the other of said motors, and for disabling the said other of said motors responsive to a certain operation of said one of said motors.

10. In a braking arrangement for a motor vehicle differential having a pair of driving axles extending from the differential to the driving wheels of the vehicle and wherein a hydraulic brake system is provided for braking each of the driving wheels, a pair of cylinders each having one end thereof closed, hydraulic fluid conduits connected from the closed end of each of said cylinders to one of the brake cylinders of the hydraulic brake system in each driving wheel, hydraulic fluid supply conduits for said hydraulic brake system for delivering hydraulic fluid under pressure under the control of the operator of the motor vehicle, said hydraulic fluid supply conduits each connected into one of said cylinders through the cylindrical surface thereof, a piston slidably mounted in each cylinder so that when said pistons are in the restored position said hydraulic fluid supply conduits connected through said cylindrical surface are connected through said cylinders to said conduits connected to said brake cylinders, and when said pistons are operated inwardly of said cylinders said hydraulic fluid supply conduits connected to the cylindrical surfaces are blocked by said pistons and further operation of said pistons inwardly of said cylinders directs hydraulic fluid to said brake cylinders to operate said hydraulic brakes in each driving wheel, means cooperating with each of said axles for moving said pistons inwardly of said cylinders responsive to a certain rotational speed of said axles, and means mounted between each of said pistons and said means cooperating with each of said axles and operating responsive to said certain rotational speed of either one of said axles for preventing the inward movement of the piston associated with the other of said axles.

11. In a braking arrangement for a motor vehicle differential as claimed in claim 10, wherein said means cooperating with each of said axles for moving said pistons inwardly of said cylinders comprises a governor mounted on each of said driving axles and operatively connected to said pistons.

12. In a braking arrangement for a motor vehicle differential as claimed in claim 10, wherein said last mentioned means comprises a second piston for each of said cylinders slidably mounted in said cylinders and cooperating with said means for moving said pistons inwardly, and means operating responsive to either one of said driving axles being substantially stopped for conditioning the cylinder associated with the other of said driving axles so that the first piston thereof follows the movement of the second piston thereof.

References Cited in the file of this patent
UNITED STATES PATENTS 2,583,307    Schneider               Jan. 22, 1952

FOREIGN PATENTS 739,011    Germany               Sept. 8, 1943